(12) United States Patent
Maruyama et al.

(10) Patent No.: US 7,748,427 B2
(45) Date of Patent: Jul. 6, 2010

(54) FUSION WELDING DEVICE AND ASSEMBLING APPARATUS

(75) Inventors: Shinichiro Maruyama, Toyama (JP); Tatsuya Maruyama, Toyama (JP)

(73) Assignee: YKK Corporation, Tokyo (JP)

( * ) Notice: Subject to any disclaimer, the term of this patent is extended or adjusted under 35 U.S.C. 154(b) by 146 days.

(21) Appl. No.: 12/046,877

(22) Filed: Mar. 12, 2008

(65) Prior Publication Data
US 2008/0223526 A1 Sep. 18, 2008

(30) Foreign Application Priority Data
Mar. 13, 2007 (JP) ............................. 2007-063167

(51) Int. Cl.
*B32B 37/00* (2006.01)
(52) U.S. Cl. .................. 156/499; 156/304.2; 156/304.6
(58) Field of Classification Search .................. 156/64, 156/73.1, 73.5, 73.6, 304.1, 304.2, 304.5, 156/304.6, 499, 538, 556, 580
See application file for complete search history.

(56) References Cited

U.S. PATENT DOCUMENTS 5,006,198 A  4/1991  Pasquini
5,902,657 A * 5/1999 Hanson et al. ........... 428/36.92
7,122,088 B2 * 10/2006 Field et al. .................. 156/73.5
2004/0108040 A1 * 6/2004 Field et al. .................. 156/73.6

FOREIGN PATENT DOCUMENTS

CA      2419006       8/2003
JP   A-2001-150552    6/2001

OTHER PUBLICATIONS

Office Action dated Dec. 7, 2009, Canadian Patent Application No. 2,625,038.

\* cited by examiner

*Primary Examiner*—James Sells
(74) *Attorney, Agent, or Firm*—Alston & Bird, LLP

(57) ABSTRACT

A fusion welding device including a first holder and a second holder where the respective holders are adapted to hold an end portion of a first work and a second work, respectively, such that the works are moveable in a longitudinal direction; a heater, operable to heat the first and second works; two movers adapted to move the first and second holders close to or apart from each other; and a third mover adapted to move the first and second holders in synchronization with each other in a direction along the first and second faces. The first and second holders are moved by the third mover where the first and second faces are in contact with each other, whereby end faces of the end portions of the first and second works are pressed to each other.

4 Claims, 9 Drawing Sheets

FUSION WELDING DEVICE AND ASSEMBLING APPARATUS

CROSS-REFERENCE TO RELATED APPLICATIONS

This application claims priority to Japanese Application No. 2007-063167, filed Mar. 13, 2007, which is hereby incorporated herein in its entirety by reference.

BACKGROUND OF THE INVENTION

The present invention relates to a fusion welding device of works for joining by fusion welding the works such as resin frame members which form a resin frame of a resin sash, a resin frame of a resin screen, etc., and an assembling apparatus of the resin frame for assembling the resin frame such as a resin window frame, a resin screen frame, etc. using the fusion welding device.

A window frame is assembled by connecting four pieces of frame members in a shape of bar (an upper frame, a lower frame, and vertical frames at right and left sides) into a rectangular shape. A sash is formed by fitting a screen to this window frame.

A screen frame is assembled by connecting four pieces of frame members in a shape of bar (an upper frame, a lower frame, and vertical frames at right and left sides) into a rectangular shape.

A screen is formed by fitting a glass panel or the like to this screen frame.

As the aforesaid window frame and screen frame, a metal frame employing frame members formed of metal (hereinafter referred to as metal frame members), and a resin frame employing frame members formed of resin (hereinafter referred to as resin frame members) have been known.

In case of the aforesaid metal frame, the frame is assembled by connecting end portions of the metal frame members to each other with small screws or the like.

On the other hand, in case of the aforesaid resin frame, the frame is assembled by cutting end portions of the resin frame members at 45 degree, and joining them by fusion welding.

As described above, in order to join the end portions of the resin frame members by fusion welding, the end portions to be joined are fused with heat of a heater, as a first step, and then, the end portions are joined to each other by abutting and pressing their end faces which have been fused to each other, and thereafter, cooled, whereby the fused parts are hardened to make an integral member.

In case where the resin frame members are joined by fusion welding as described above, the end portions of the resin frame members are pressed when they are fused by the heater, or when the fused end portions are joined. Consequently, the end portions protrude outward, and fins may occur.

Generally, these fins are removed by cutting with a cutter or the like after the end portions have been joined.

Such being the circumstances, a process for removing the fins is required, and therefore, assembling cost for the resin frame is increased.

Moreover, those regions where the fins have been removed by cutting may be sometimes different in color from other regions, and hence, an outer appearance is deteriorated.

In view of the above, a related-art fusion welding device for preventing occurrence of fins in the regions which have been joined by fusion welding (a heat-fusion joining and working device) is disclosed in JP-A-2001-150552.

This related-art fusion welding device includes a pair of work grasping units which grasp the work to move it between a waiting position and a heat fusing position, and a heater unit. A mold assembly of the work grasping unit includes a fixed side mold assembly and a movable side mold assembly. The movable side mold assembly is movable toward the fixed side mold assembly when pressed at a time of joining. Because end portions of the work are fused and joined by fusion welding in a state where the end portions have entered in the movable side mold assembly, the end portions will not protrude outward, and occurrence of fins can be prevented.

In the above described related-art fusion welding device, when the end portions of the works are fused and joined by fusion welding, fusion and fusion welding are carried out, by moving the movable side mold assembly toward the fixed side mold assembly. However, because the movable side mold assembly is supported by a resilient member such as a spring, and the mold assembly is closed with a spring force, there is such anxiety that the mold may be opened with pressure of fins which apt to protrude outward, and the fins may occur.

Moreover, in order to press the end portions of the two works, the works are moved in respective longitudinal directions thereof together with the respective work grasping units (the mold assembly) in a state where the end portions of the works are grasped by the respective work grasping units, whereby the end portions come close to each other to be pressed.

For this reason, in order to assemble a frame, fusion welding operation must be conducted at every corner of the frame, and hence, assembling work of the frame requires a considerable time.

For example, in case where the frame in a rectangular shape is assembled, fusion welding operations must be sequentially conducted four times at the four corners of the frame, and the assembling work requires a lot of time.

SUMMARY

It is therefore an object of the invention to provide a fusion welding device in which occurrence of fins can be reliably prevented when end portions of works are joined by fusion welding, and moreover, end portions of a plurality of works are joined by fusion welding at the same time in all corner parts of a frame, when the frame is formed by joining the end portions of the works by fusion welding, and an assembling apparatus of a resin frame.

In order to achieve the object, according to the invention, there is provided a fusion welding device, comprising:

a first holder, having a first face, and adapted to hold at least an outer peripheral face of an end portion of a first work in a state where the first work is movable in a longitudinal direction thereof;

a second holder, having a second face opposed to the first face, and adapted to hold at least an outer peripheral face of an end portion of a second work in a state where the second work is movable in a longitudinal direction thereof;

a heater, operable to heat the first work and the second work;

a first mover and a second mover, adapted to move the first holder and the second holder in such directions that the first face and the second face come close to or apart from each other; and a third mover, adapted to move the first holder and the second holder in synchronization with each other in a direction along the first face and the second face, wherein the first holder and the second holder are moved by the third mover in a state where the first face and the second face are in contact with each other, whereby end faces of the end portions of the first and second works are pressed to each other in the longitudinal directions thereof in the first and second holders.

The fusion welding device may further include a fourth mover. The heater may have a third face and a fourth face. When the heater is disposed in a first position, the third face can be contacted with the first face of the first holder and the fourth face can be contacted with the second face of the second holder. When the heater is disposed in a second position, the third face cannot be contacted with the first face and the fourth face cannot be contacted with the second face. The fourth mover may move the heater between the first position and the second position. When the first and second holders are moved by the third mover, the heater may be moved together with the first and second holders.

The first holder, the second holder, the heater, the first mover, the second mover, and the fourth mover may be provided on a moving body. The third mover may include a base member and the moving body mounted on the base member so as to move in the direction along the first face and the second face.

According to the invention, there is provided an assembling apparatus, incorporating a plurality of the fusion welding device respectively mounted to corner parts of a resin frame to be assembled.

According to the invention, there is also provided an assembling apparatus, comprising:

a body, including a first body, a second body attached to the first body so as to move in a lateral direction, and a third body attached to the first body, the second body provided with a first fusion welding device and a second fusion welding device which can move in a vertical direction, the third body provided with a third fusion welding device and a fourth fusion welding device which can move in a vertical direction, wherein each of the first, second, third and fourth fusion welding devices is provided with a first and second holders adapted to hold at least outer peripheral faces of end portions of resin frame members in a state where the frame members are movable in longitudinal directions thereof, a heater operable to heat the frame members, a first and second mover operable to move the first and second holders in such directions that contact faces of the first and second holders, which are opposed to each other, come close to or apart from each other, the first, second, third and fourth fusion welding devices are positioned in respective corner parts of a frame, and both of the end portions of each of the frame members are respectively held by the first and second holders of adjacent two of the first, second, third and fourth fusion welding devices, and the first, second, third and fourth fusion welding devices are moved, in a state where the contact firsts are in contact with each other, in such directions that distances of adjacent two of the first, second, third and fourth fusion welding devices are reduced, so that the end portions of the frame members are joined by fusion welding.

DETAILED DESCRIPTION OF PREFERRED EMBODIMENTS

Figure 1:
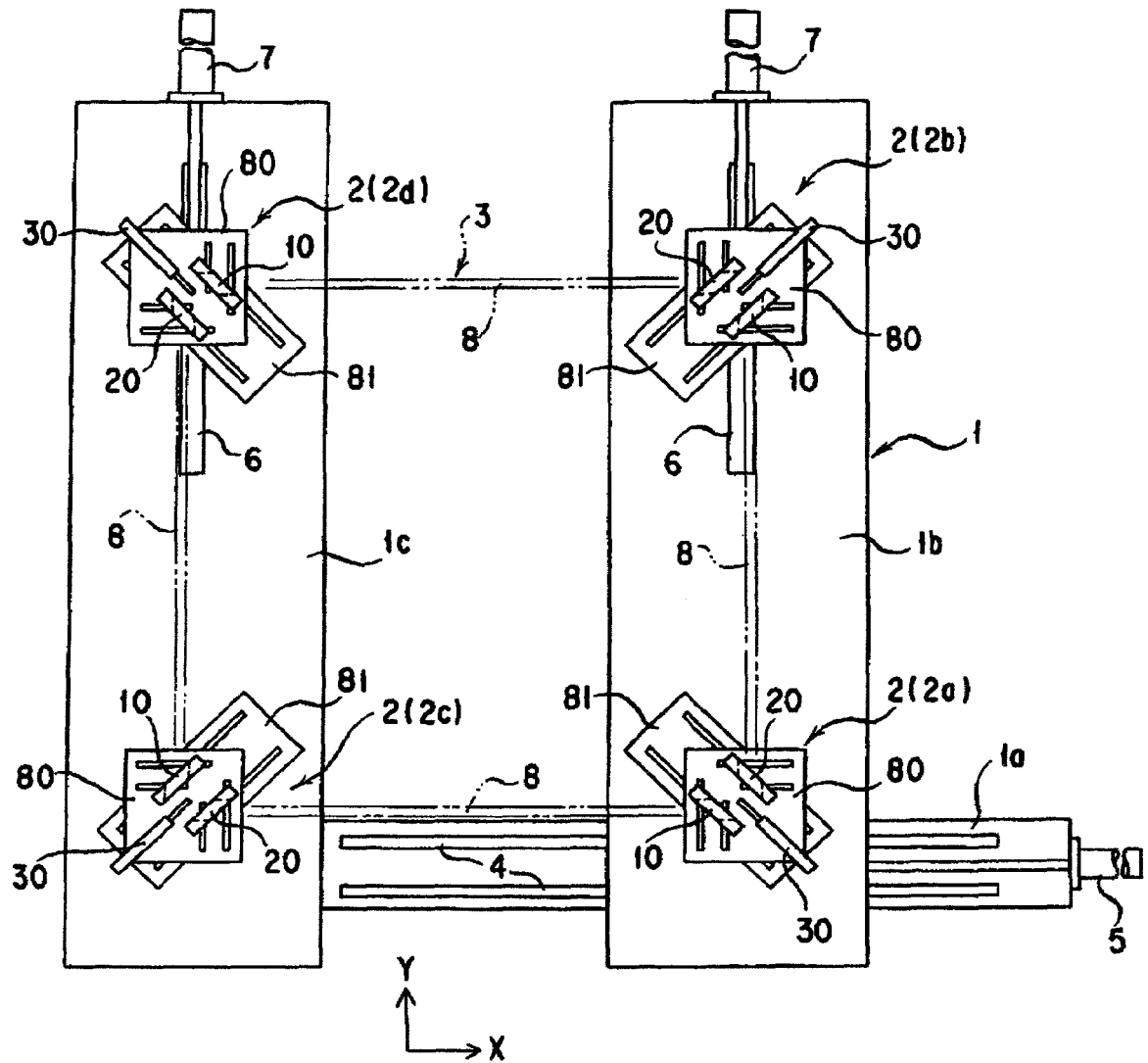
FIG. 1 is a schematic front view of an assembling apparatus of a resin frame in an embodiment according to the invention.

FIG. 1 shows an assembling apparatus of a resin frame in which a plurality of fusion welding devices 2 are mounted on a body 1 to assemble a frame 3.

Each of the fusion welding devices 2 joins end portions in a longitudinal direction of two works at a determined angle by fusion welding, and provided at every corner of the frame 3.

In this embodiment, the fusion welding device 2 joins the end portions of the two works at 90 degree, and the frame 3 has a rectangular shape.

The body 1 includes a laterally directed first body 1a which is longer in a lateral direction (a direction X), a second body 1b which is longer in a vertical direction (a direction Y) and moves in the lateral direction along this first body 1a, and a third body 1c which is longer in the vertical direction and fixed to the first body 1a.

For example, a pair of first guide rails 4 are provided on the first body 1a which is laterally longer, and the second body 1b which is vertically longer is mounted on these first guide rails 4 so as to move in the lateral direction. A laterally directed first cylinder 5 is mounted across the second body 1b and the first body 1a, so that the second body 1b can move in the lateral direction by extending and contracting the first cylinder 5.

The fusion welding device 2 includes a first fusion welding device 2a which is attached to a lower part of the second body 1b, a second fusion welding device 2b which is attached to an upper part of the second body 1b so as to move in the vertical direction, a third fusion welding device 2c which is attached to a lower part of the third body 1c, and a fourth fusion welding device 2d which is attached to an upper part of the third body 1c so as to move in the vertical direction.

The first to fourth fusion welding devices 2a to 2d are respectively positioned in the four corner parts of the frame 3 in the rectangular shape.

Second guide rails 6 are respectively provided in the upper parts of the second and third bodies 1b, 1c in the vertical direction. The second and fourth fusion welding devices 2b, 2d are respectively mounted so as to move along the second guide rails 6. Vertically directed second cylinders 7 are mounted across the second and third bodies 1b, 1c and the second and fourth fusion welding devices 2b, 2d, so that the second and fourth fusion welding devices 2b, 2d can move in the vertical direction by extending and contracting the second cylinders 7. When the second and fourth fusion welding devices 2b, 2d move, they come close to or move apart from the first and third fusion welding devices 2b, 2c.

The first and second moving units are not limited to the cylinder, but may be a rack-and-pinion, or a feed screw and a nut.

In this manner, by moving the second body 1b in the lateral direction, the first and second fusion welding devices 2a, 2b move in the lateral direction, and it is possible to assemble the frames 3 having different sizes in the lateral direction.

Moreover, by moving the second and fourth fusion welding devices 2b, 2d with respect to the second body 1b and the third body 1c in the vertical direction, it is possible to assemble the frames 3 having different sizes in the vertical direction.

Further, by moving the second body 1b in the lateral direction, and by moving the second and fourth fusion welding devices 2b, 2d in the vertical direction, it is possible to assemble the frames 3 having different sizes both in the lateral direction and in the vertical direction.

Figure 2A:
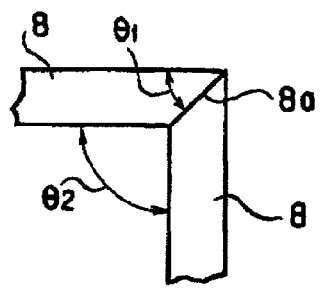
FIGS. 2A and 2B are views for explaining an angle of inclination of end faces of works.
Figure 2B:
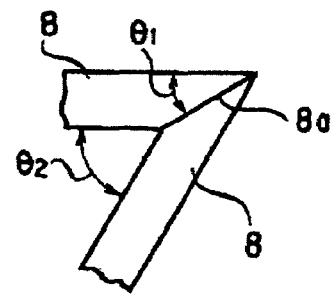

As shown in FIGS. 2A and 2B, end faces 8a in the longitudinal direction of works 8 (resin frame members which are components of the frame 3) to be joined by fusion welding with the fusion welding device 2 are inclined with respect to a right angle with the longitudinal direction.

An angle of inclination $\theta1$ of the end faces 8a of the works 8 is a half of a corner angle $\theta2$ of the frame 3.

For example, in case where the corner angle $\theta2$ of the frame 3 is 90 degree, as shown in FIG. 2A, the angle of inclination $\theta1$ is 45 degree. In case where the corner angle $\theta2$ is 60 degree, as shown in FIG. 2B, the angle of inclination $\theta1$ is 30 degree.

Then, the fusion welding device 2 (2a, 2b, 2c, 2d) will be described referring to FIGS. 3 to 7.

Figure 3:
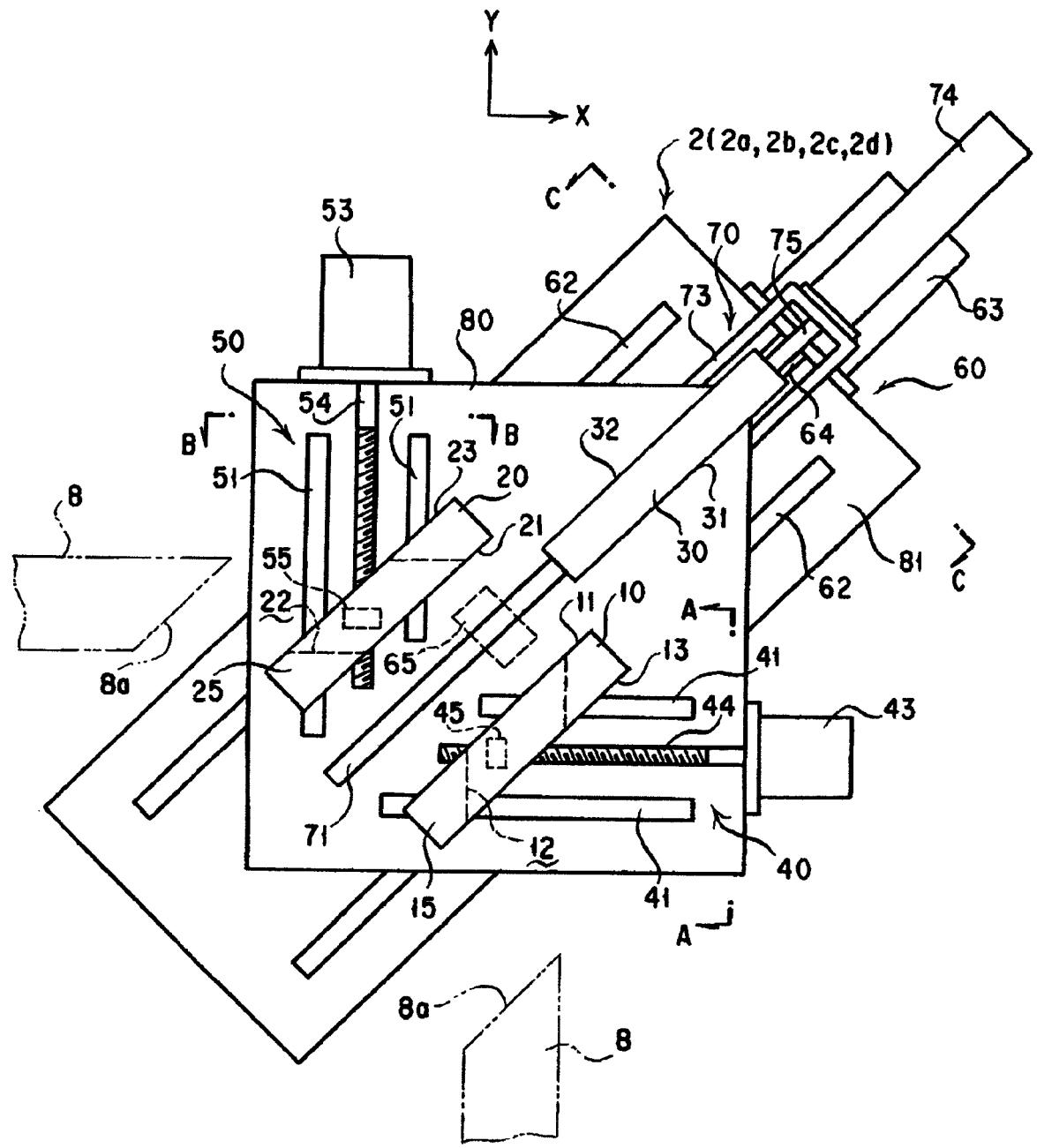
FIG. 3 is an enlarged front view showing a fusion welding device.

The fusion welding device 2 includes a first holding unit 10, a second holding unit 20, and a heating unit 30, as shown in FIG. 3.

The first holding unit 10 and the second holding unit 20 can move along outer peripheral faces of the works 8 in the longitudinal directions thereof and hold the end portions of outer peripheral faces with almost no clearance. The first holding unit 10 and the second holding unit 20 respectively have contact faces 11 and 21 opposed to each other. Expression "with almost no clearance" means both a case where the contact face is in contact with the outer peripheral face of the work 8, and a case where the contact face is slightly apart from the outer peripheral face of the work 8.

For example, the first holding unit 10 and the second holding unit 20 have respective holding spaces 12, 22 which have substantially the same shape as a cross sectional shape of the work 8 (a sectional shape at a right angle with respect to the longitudinal direction). These holding spaces 12, 22 are open on end faces 13, 23 at the opposite side to the contact faces 11, 21.

Figure 4A:
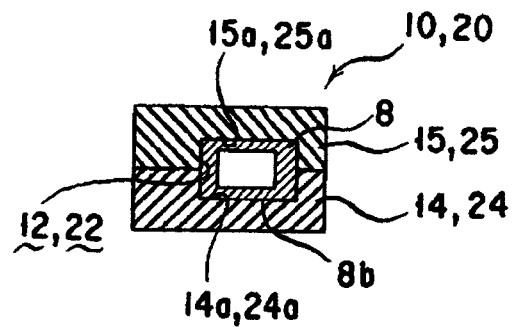
FIGS. 4A and 4B are views for explaining a holding unit.

Specifically, as shown in FIG. 4A, the holding space 12 or 22 is formed by combining a recess 14a, 24a of a lower mold 14, 24 and a recess 15a, 25a of an upper mold 15, 25. The outer peripheral face 8b of the work 8 is held on an inner peripheral face of the holding space 12, 22 with almost no clearance, but can move in the holding space 12, 22.

Figure 4B:
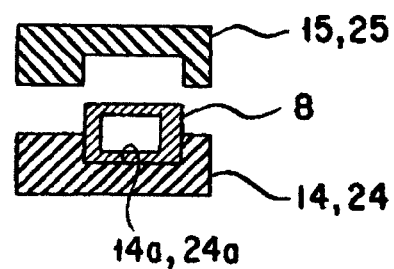

As shown in FIG. 4B, by separating the upper mold 15, 25 from the lower mold 14, 24, it is possible to set or remove the work 8 in or from the recess 14a, 24a in the lower mold 14, 24.

The contact faces 11, 21 of the first and second holding units 10, 20 which are opposed to each other have the same angle as the angle of inclination of the end faces 8a of the works 8. When the works 8 are held by the first and second holding units 10, 20, the contact faces 11, 21 and the end faces 8a of the works 8 can be continued to be flush with each other.

The first and second holding units 10, 20 respectively move in parallel with each other between a first position where the contact faces 11 and 21 are in contact with each other, and second and third positions where the contact faces 11, 21 are separated from each other.

For example, the first and second holding units 10, 20 are respectively moved by first and second parallel moving units 40, 50 in parallel with each other. These movements by the first and second parallel moving units 40, 50 are effected in a direction perpendicular to the longitudinal direction of the works 8 which are respectively held by the holding units.

Moreover, the first and second holding units 10, 20 are respectively moved synchronously in a direction along their contact faces 11 and 21.

For example, the first and second holding units 10, 20 are moved synchronously in the direction along their contact faces 11 and 21 by a synchronous moving unit 60. In short, both the first and second holding units 10, 20 are moved at the same time.

The aforesaid heating unit 30 has a first heating face 31 which is contacted with the contact face 11 of the first holding unit 10, and a second heating face 32 which is contacted with the contact face 21 of the second holding unit 20. These first and second heating faces 31, 32 are flat.

The heating unit 30 is moved between a heating position which is located between the first and second holding units 10 and 20 (between the contact faces 11 and 21), and a retreating position where it has retreated from the position between the first and second holding units 10, 20.

For example, the heating unit 30 is moved by a moving unit 70 between the heating position and the retreating position.

In other words, the heating position is a position where the first heating face 31 can be contacted with the contact face 11 of the first holding unit 10 and the second heating face 32 can be contacted with the contact face 21 of the second holding unit 20, when the heating unit 30 is disposed in the position. On the other hand, the retreating position is a position where the first heating face 31 cannot be contacted with the contact face 11 of the first holding unit 10 and the second heating face 32 cannot be contacted with the contact face 21 of the second holding unit 20, when the heating unit 30 is disposed in the position.

Figure 5:
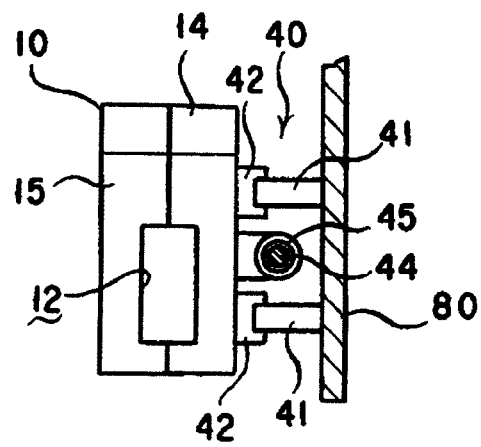
FIG. 5 is a sectional view taken along a line A-A in FIG. 3.
Figure 6:
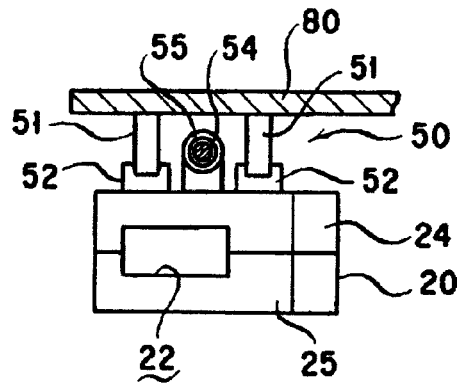
FIG. 6 is a sectional view taken along a line B-B in FIG. 3.

Referring to FIGS. 5 and 6, a specific embodiment of the aforesaid first and second parallel moving units 40, 50 will be described.

A first rail 41 and a second rail 51 are provided on a moving body 80. Then, a first guide 42 and a second guide 52 which are respectively provided on the first and second holding units 10, 20 (the lower molds 14, 24) are slidably engaged with the first and second rails 41, 51 so that the first and second holding units 10, 20 can move in the directions perpendicular to the longitudinal directions of the works 8 which are held.

For this reason, when the holding units move between the first position and the second and third positions, they can move to determined positions, even though the works 8 are movably held by the holding units.

First and second electric motors 43, 53 are mounted on the moving body 80. Then, feed screw rods 44, 54 which are rotated by the first and second motors 43, 53 are screwed with nuts 45, 55 which are fitted to the first and second holding units 10, 20 so as to rotate but not to move. When the first and second electric motors 43, 53 are driven, the first and second holding units 10, 20 are moved. In this manner, the first and second parallel moving units 40, 50 are constructed.

The first and second parallel moving units 40, 50 are driven to move the first and second holding units 10, 20 for the same distance, and controlled so that the first and second holding units 10, 20 may be at symmetrical positions with respect to a corner part of the frame 3.

For example, the first electric motor 43 and the second electric motor 53 are synchronously controlled so that the first and second holding units 10, 20 can move for the same distance.

The first and second parallel moving units 40, 50 are not limited to those as described above, but a cylinder or a rack-and-pinion may be employed as the parallel moving units.

Figure 7:
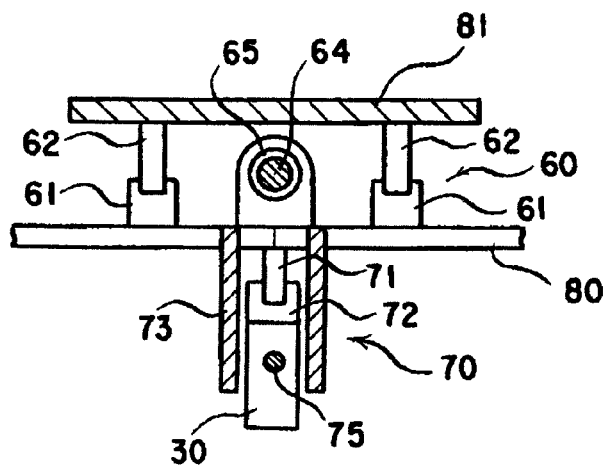
FIG. 7 is a sectional view taken along a line C-C in FIG. 3.

Referring to FIG. 7, a specific embodiment of the synchronous moving unit 60 will be described.

Guides 61 provided on the moving body 80 are slidably engaged with rails 62 provided on a base member 81. Then, an electric motor 63 is mounted on the base member 81, and a feed screw rod 64 rotated by the electric motor 63 is screwed with a nut 65 which is fitted to the moving body 80 so as to rotate but not to move. When the electric motor 63 is driven, the moving body 80 is moved with respect to the base member 81. In this manner, the synchronous moving unit 60 is constructed. This movement by the synchronous moving unit 60 is called as synchronous movement, because the first and second holding units 10, 20 are moved at the same time.

In the above described structure, because it would be sufficient to drive and control the only one electric motor 63, the structure is simple and can be easily controlled.

The synchronous moving unit 60 is not limited to the structure as described above, but a cylinder or a rack-and-pinion may be employed for moving the moving body 80.

Moreover, the first and second holding units 10, 20 may be moved by separate moving units, provided that the separate moving units are synchronously driven.

A specific embodiment of the moving unit 70 will be described.

A rail 71 is mounted on the aforesaid moving body 80, and a guide 72 engaged with this rail 71 is fitted to the heating unit 30.

A cylinder 74 is mounted on the moving body 80 by way of a bracket 73, and a piston rod 75 of the cylinder 74 is coupled to the heating unit 30. By extending and contracting the piston rod 75 of the cylinder 74, the heating unit 30 moves between the heating position and the retreating position. In this manner, the moving unit 70 is constructed.

As this moving unit 70, a cylinder, and a rack-and-pinion may be employed.

As shown in FIG. 1, the base member 81 of the first fusion welding device 2a is attached to the lower part of the second body 1b, and the base member 81 of the second fusion welding device 2b is attached to the upper part of the second body 1b so as to move in the vertical direction.

The base member 81 of the third fusion welding device 2c is attached to the lower part of the third body 1c, and the base member 81 of the fourth fusion welding device 2d is attached to the upper part of the third body 1c so as to move in the vertical direction.

Then, the moving body 80 of the first fusion welding device 2a and the moving body 80 of the fourth fusion welding device 2d move in the respective directions opposed to each other. The moving body 80 of the second fusion welding device 2b and the moving body 80 of the third fusion welding device 2c move in the respective directions opposed to each other.

Specifically, the first and fourth fusion welding devices 2a, 2d are positioned in the two corner parts of the frame 3 which are opposed to each other on a diagonal line, while the second and third fusion welding devices 2b, 2c are positioned in the remaining two corner parts of the frame 3 which are opposed to each other on a diagonal line.

Then, operation of the fusion welding device 2 for joining the two works 8 to each other by fusion welding will be described.

Figure 8:
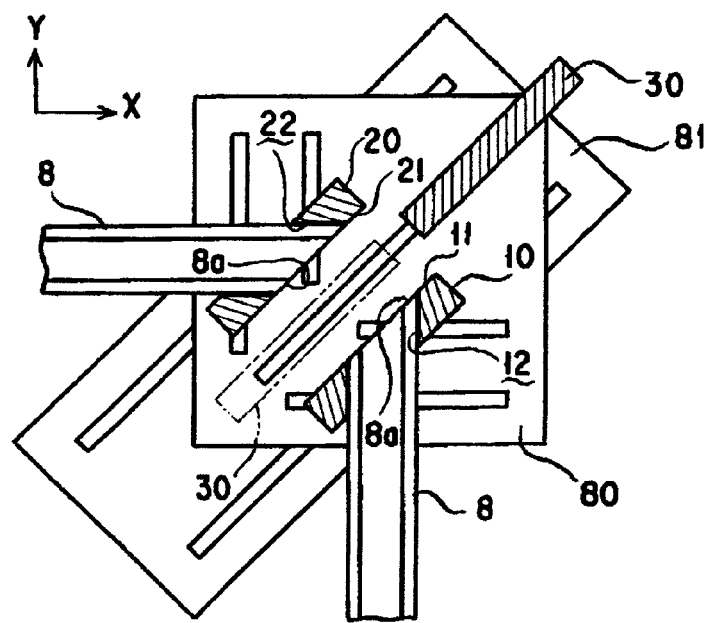
FIG. 8 is a view for explaining operation for joining the works by fusion welding.

As shown in FIG. 8, the first and second holding units 10, 20 are positioned in the third position where their contact faces 11, 21 are remarkably separated, and the end portions of the works 8 are respectively held in the holding spaces 12, 22.

In this state, the heating unit 30 is moved to the heating position, as shown by a phantom line in FIG. 8.

Figure 9:
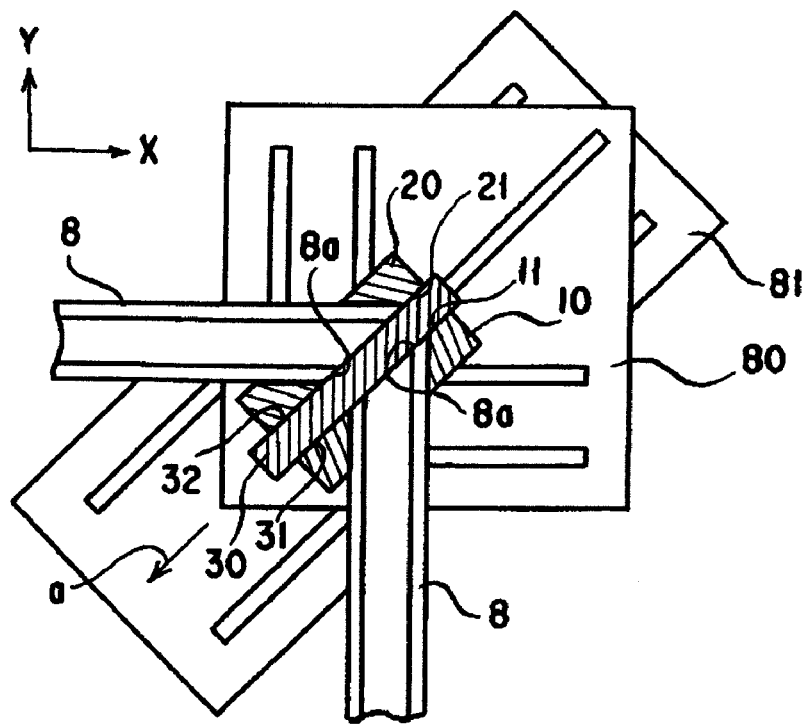
FIG. 9 is a view for explaining the operation for joining the works by fusion welding.
Figure 10:
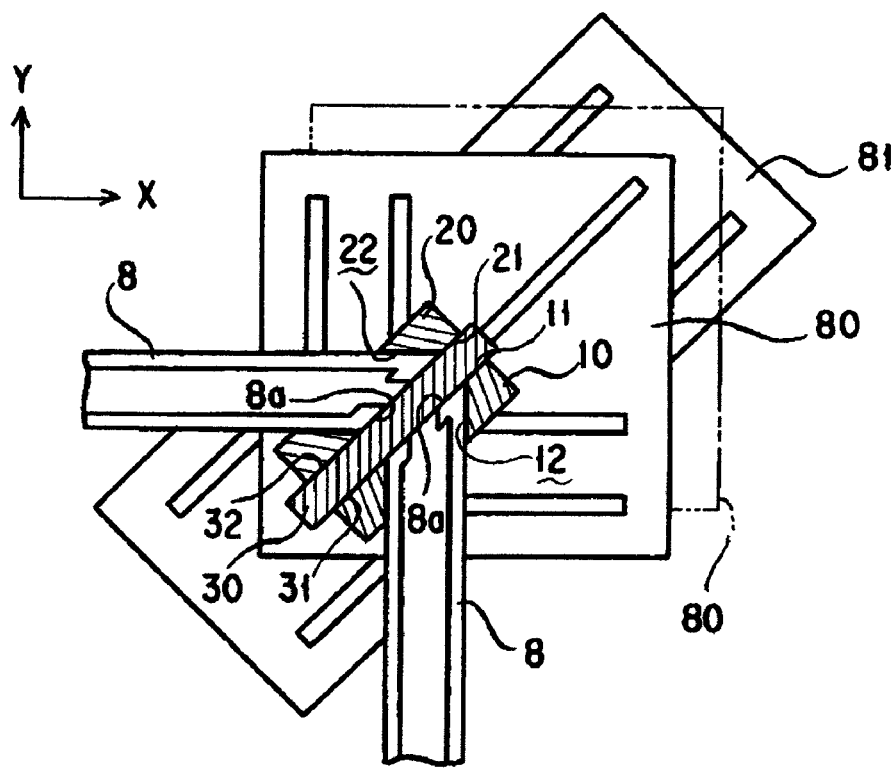
FIG. 10 is a view for explaining the operation for joining the works by fusion welding.

As shown in FIG. 9, the first and second holding units 10, 20 are moved, in parallel, to the second position where the contact faces 11, 21 are separated, and the contact faces 11, 21 are brought into contact with the first and second heating faces 31, 32 of the heating unit 30.

In this state, the heating unit 30 is heated, and the moving body 80 is moved in a direction of an arrow mark a.

With this movement, the first and second holding units 10, 20 synchronously move in the direction along their contact faces 11, 21 (the direction of the arrow mark a), and at the same time, the heating unit 30 also moves. Accordingly, the works 8 move with respect to the first and second holding units 10, 20 in their longitudinal directions opposed to each other, so as to project from the contact faces 11, 21.

Specifically, the end portion of the work 8 at an opposite side to the end portion which is held by one of the fusion welding devices 2a to 2d tends to move so as to project from the contact faces 11, 21 of the first and second holding units 10, 20 of the other fusion welding device 2a to 2d, whereby the end faces 8a of the works 8 are strongly pressed to the first and second heating faces 31, 32 of the heating unit 30, and thus, the end portions of the works 8 are fused.

In this manner, the end portions of the works 8 are pressed onto the heating unit 30 (the first and second heating faces 31, 32) in a state held in the holding spaces 12, 22 of the first and second holding units 10, 20, thereby to be fused. Therefore, the end portions of the works 8 will not protrude outward, when they are fused, and fins will not occur.

In this embodiment, the works 8 are hollow-shaped, and are fused in such a manner that their end portions enter into the hollow spaces. Therefore, a region to be fused is elongated, and it is possible to enlarge the region to be joined by fusion welding.

Moreover, when the end portions of the works 8 are fused, as described above, the works 8 do not move in their longitudinal directions in a state held in the holding spaces. Therefore, in case of assembling the frame 3, it is possible to fuse the end portions of the works 8 at the same time in the respective corner parts.

Thereafter, the first and second holding units 10, 20 are moved, in parallel, to the above described third position, and the heating unit 30 is moved to the retreating position.

Figure 11:
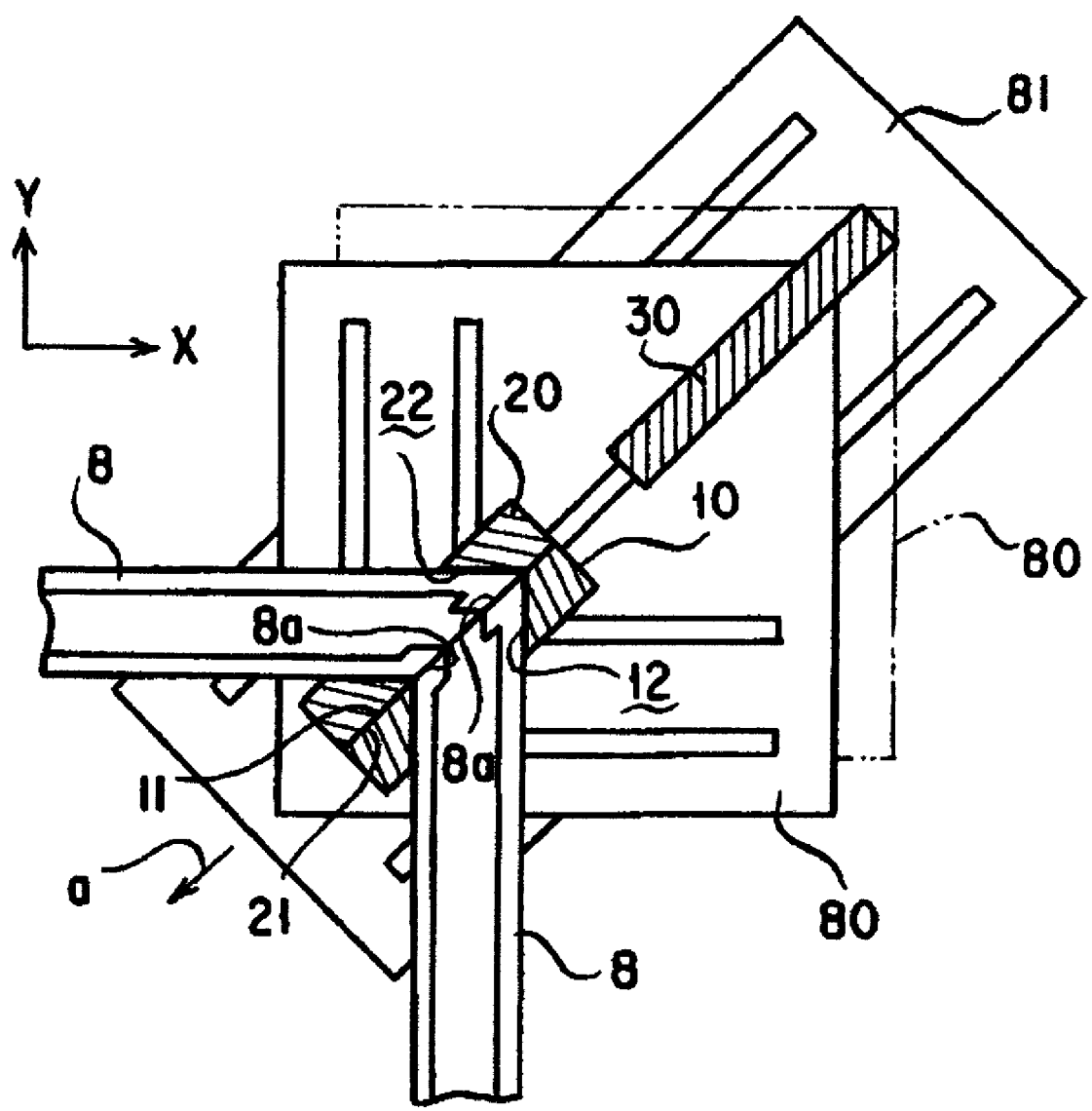
FIG. 11 is a view for explaining the operation for joining the works by fusion welding.

In this state, the first and second holding units 10, 20 are moved to the first position where the contact faces 11, 21 are in contact, as shown in FIG. 11, whereby the contact faces 11 and 12 are brought into contact with each other.

In this state, the moving body 80 is further moved in the direction of the arrow mark a, in the same manner as described above, whereby the end faces 8a of the works 8 are pressed to each other and joined together.

As described above, the end faces 8a of the works 8 are pressed to each other and joined by fusion welding, in a state where the end portions are held in the holding spaces 12, 22 of the first and second holding units 10, 20. Therefore, fins will not occur in the joined region.

Moreover, the works 8 are moved in the respective longitudinal directions in a state opposed to each other, when the first and second holding units 10, 20 are moved by the synchronous moving unit 60, and when the end faces 8a of the works 8 are in contact with each other, the works 8 do not move in the longitudinal directions in a state held in the holding spaces. Therefore, in case of assembling the frame 3, it is possible to join the respective corner parts at the same time.

In the above described embodiment, the first and second holding units 10, 20 and the heating unit 30 are mounted on the moving body 80 so that the heating unit 30 may move at the same time with the first and second holding units 10, 20, when the end portions of the works 8 are fused. However, the structure is not limited to the above described. In case where the first and second holding units 10, 20 are moved by separate moving units as described above, it is possible to drive and control the moving unit 70 synchronously with the separate moving units or to move the heating unit 30 by an external force.

In short, it would be sufficient that the heating unit 30 moves with the first and second holding units 10, 20, when the first and second holding units synchronously move.

Moreover, a manner of fusing the end portions of the works 8 is not limited to the above-described manner. For example, it is possible to fuse the end portions of the works 8 by butting the heating unit 30 against the end portions.

Then, operation for assembling a resin frame, employing the assembling apparatus of the resin frame as shown in FIG. 1 will be described. The work 8 is described as a resin frame member 8.

Figure 12:
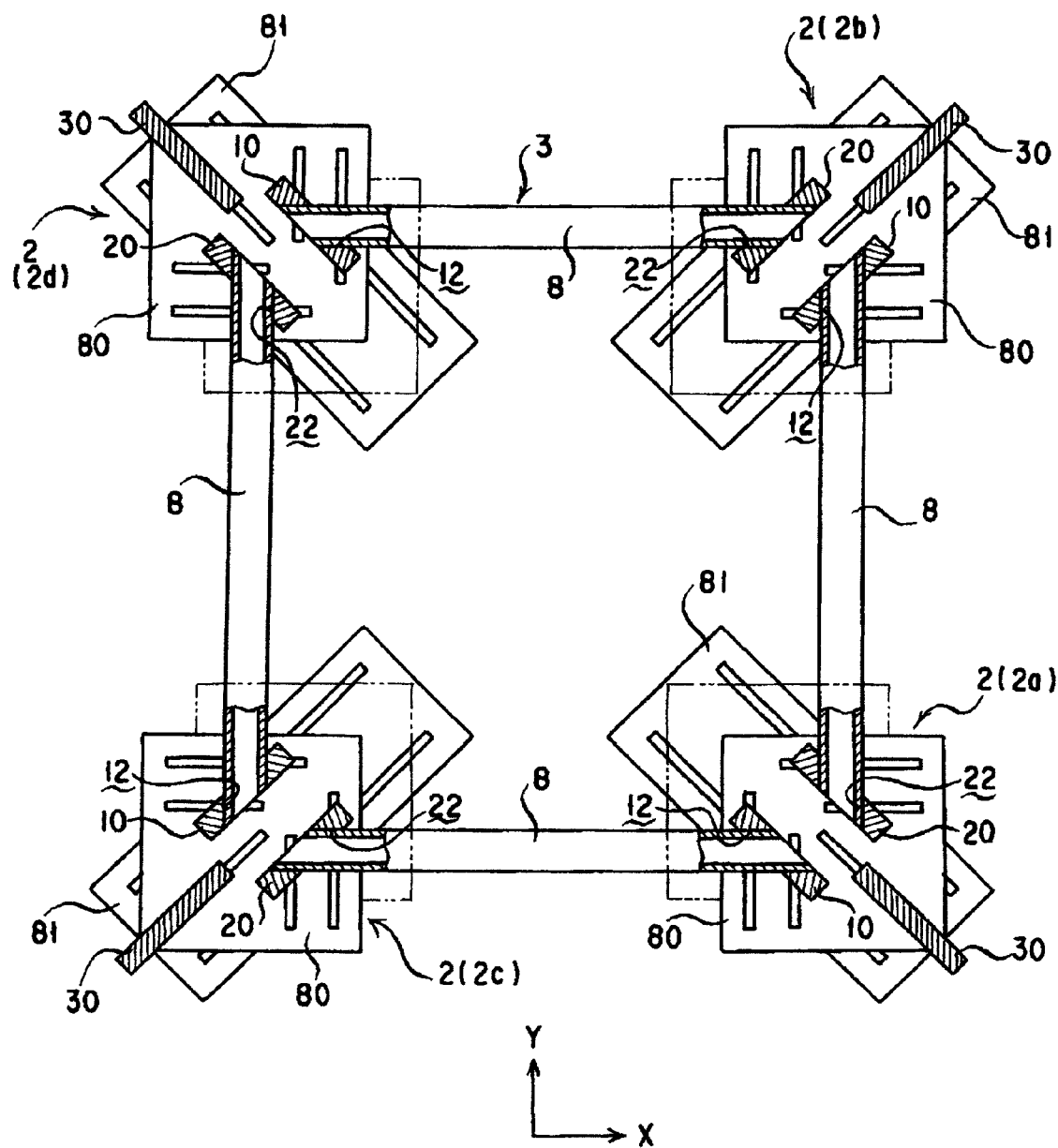
FIG. 12 is a view for explaining assembling operation of a resin frame.

As shown in FIG. 12, both end portions in a longitudinal direction of a first resin frame member 8 are set and held between the holding space 22 of the second holding unit 20 of the first fusion welding device 2a and the holding space 12 of the first holding unit 10 of the second fusion welding device 2b, as described above, and both end portions in a longitudinal direction of a second resin frame member 8 are set and held between the holding space 12 of the first holding unit 10 of the first fusion welding device 2a and the holding space 22 of the second holding unit 20 of the third fusion welding device 2c.

In the same manner, both end portions in a longitudinal direction of a third resin frame member 8 are set and held between the holding space 12 of the first holding unit 10 of the third fusion welding device 2c and the holding space 22 of the second holding unit 20 of the fourth fusion welding device 2d, and both end portions in a longitudinal direction of a fourth resin frame member 8 are set and held between the holding space 12 of the first holding unit 10 of the forth fusion welding device 2d and the holding space 22 of the second holding unit 20 of the second fusion welding device 2b.

In short, the first fusion welding device 2a is adjacent to the second fusion welding device 2b and the third fusion welding device 2c, while the fourth fusion welding device 2d is adjacent to the second fusion welding device 2b and the third fusion welding device 2c. Both the end portions in the longitudinal direction of the resin frame member 8 are held between the holding spaces 12 and 22 of the first and second holding units 10, 20 of the adjacent fusion welding devices.

In this state, the first to fourth fusion welding devices 2a to 2d are operated at the same time, in the same manner as shown in FIGS. 8 to 11, and the end portions of the resin frame members 8 are joined by fusion welding in the corner parts as shown in FIGS. 2A and 2B. In other words, the first to fourth fusion welding devices 2a to 2d are moved, in a state where the contact faces 11, 21 are in contact with each other, in such directions that distances of adjacent two of the first to fourth fusion welding devices 2a to 2d are reduced, so that the end portions of the frame members 8 are joined by fusion welding.

In this case, the end faces 8a of the four resin frame members 8 are pressed to each other in the respective corner parts, and hence, the end faces 8a can be effectively joined by fusion welding.

In the above described embodiment, the frame 3 in a rectangular shape is assembled. However, the frame 3 is not limited to the rectangular shape. It is possible to assemble the frame 3 of a desired shape, such as a triangular shape, a pentagonal shape.

Figure 13:
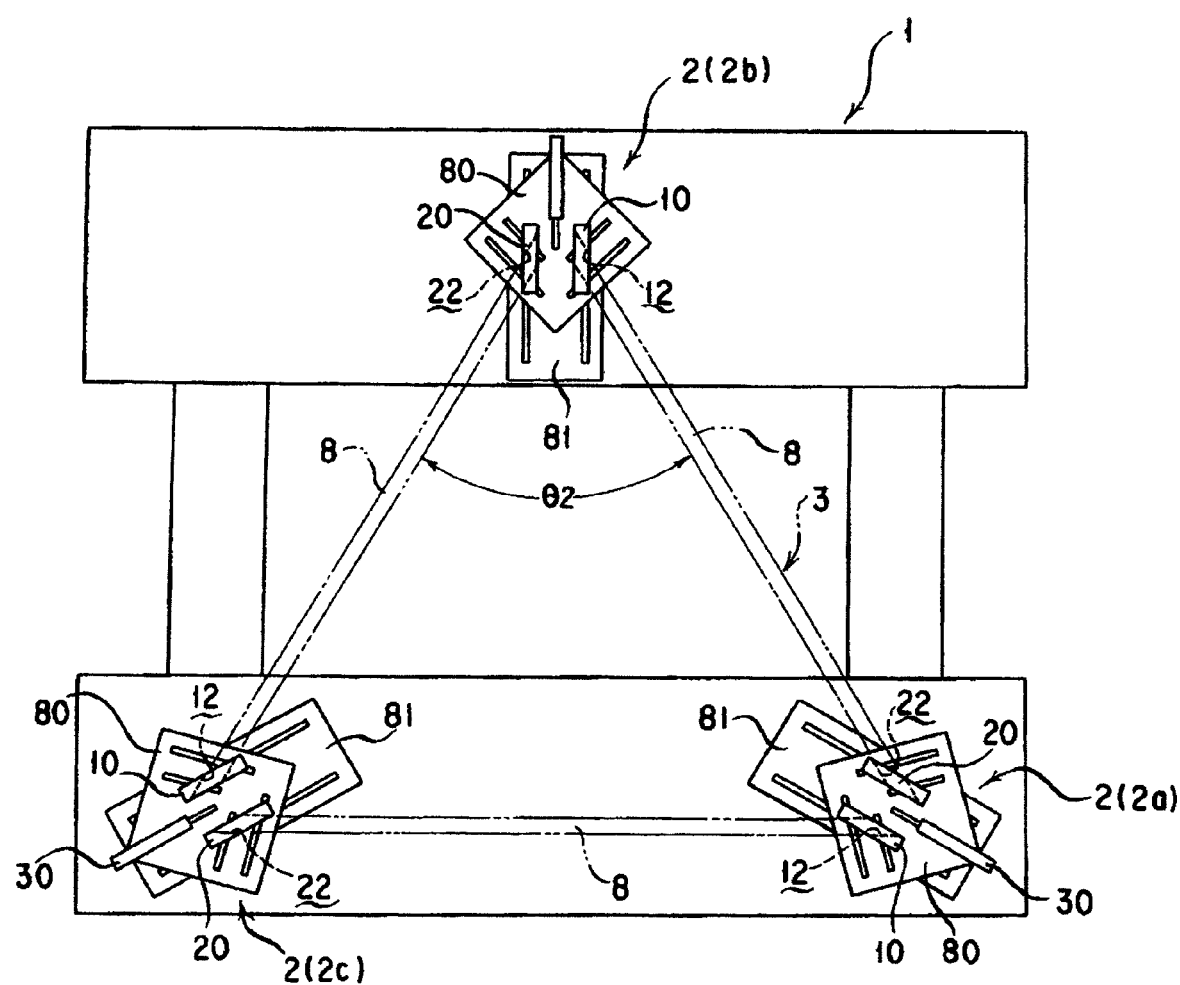
FIG. 13 is a front view of an assembling apparatus of a resin frame in another example of the first embodiment according to the invention.

For example, as shown in FIG. 13, it is possible to assemble the frame 3 in a triangular shape by fusion welding, by providing the first, second and third fusion welding devices 2a, 2b, 2c in the respective corner parts of the frame 3 in a triangular shape.

In this case, the corner angle θ2 is 60 degree, and so, the angle of inclination of the end faces 8a of the works 8 is 30 degree.

Figure 14:
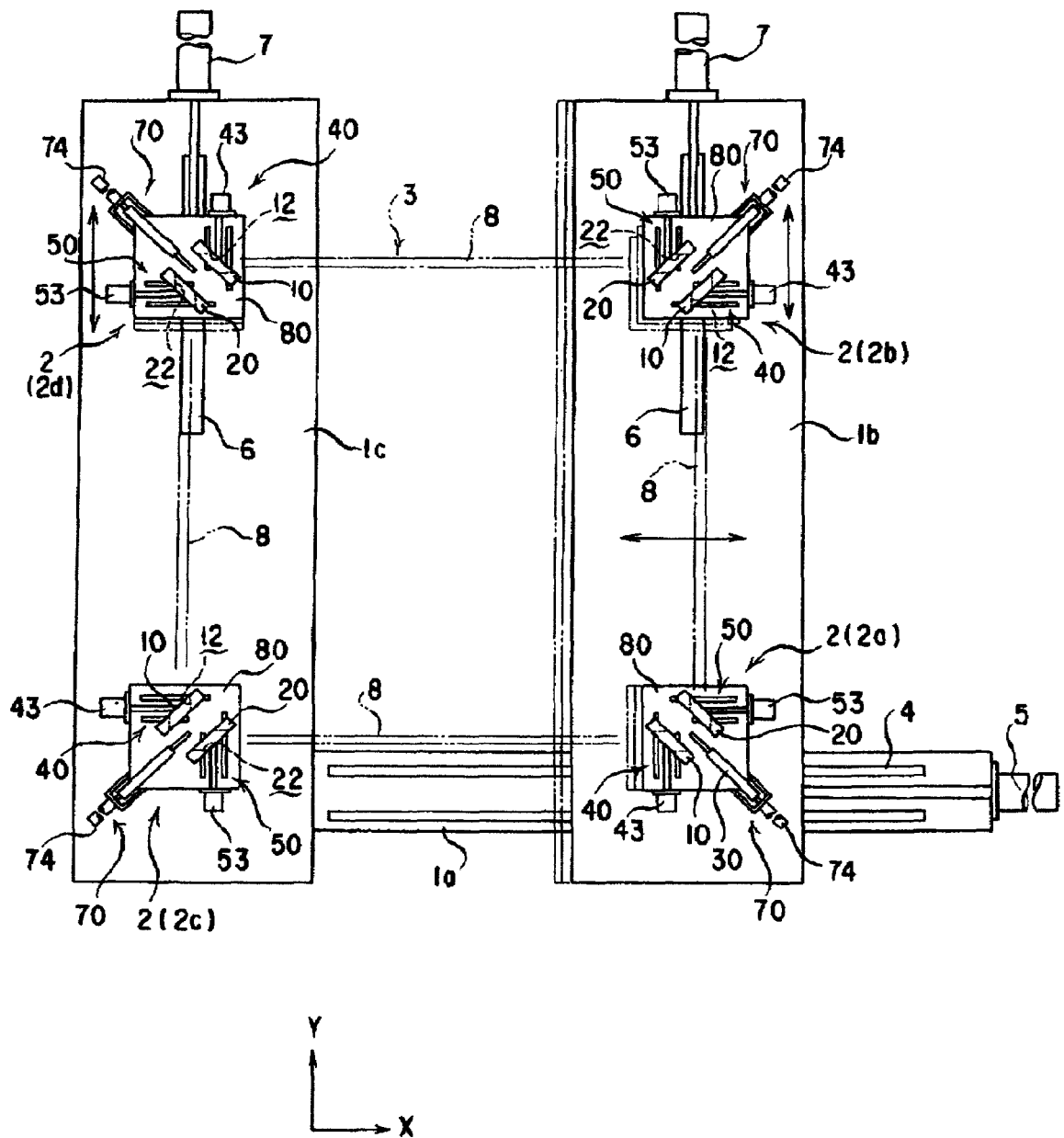
FIG. 14 is a front view of an assembling apparatus of a resin frame in a second embodiment according to the invention.

Then, a second embodiment of the assembling apparatus of the resin frame will be described referring to FIG. 14.

In the same manner as the aforesaid body 1 as shown in FIG. 1, the body 1 includes the first body 1a, the second body 1b, and the third body 1c. The second body 1b moves in a lateral direction with respect to the first body 1a.

The first and second fusion welding devices 2a, 2b are mounted on the second body 1b, in the same manner as in the apparatus as shown in FIG. 1.

The third and fourth fusion welding devices 2c, 2d are mounted on the third body 1c, in the same manner as in the apparatus as shown in FIG. 1.

The first to fourth fusion welding devices 2a to 2d have the same structure as the fusion welding device 2 as shown in FIG. 3, except that they are not provided with the synchronous moving unit 60 in the fusion welding device 2 as shown in FIG. 3.

In short, each of the first to fourth fusion welding devices 2a to 2d includes the first and second holding units 10, 20, the heating unit 30, the first and second parallel moving units 40, 50, and the moving unit 70. These units are mounted on the first moving body 80.

In this embodiment, in the second and fourth fusion welding devices 2b, 2d, the moving body 80 is attached to the second guide rail 6 so as to move up and down, and the first and third fusion welding devices 2a, 2c are attached to the respective lower ends of the second and third bodies 1b, 1c. When the second body 1b moves along the direction X so as to come close to or apart from the third body 1c, the first fusion welding device 2a moves close to or apart from the third fusion welding device 2c.

Then, operation for assembling the frame 3 will be described. It is to be noted that the work 8 is described as the resin frame member 8.

In the same manner as described above, both the end portions in the longitudinal direction of the resin frame member 8 are set between the holding spaces 12, 22 of the first and second holding units 10, 20 of the fusion welding devices which are adjacent to each other, and held so as to move in the longitudinal direction.

In the above described state, the first and second holding units 10, 20 of the respective fusion welding devices 2 are positioned in the third position where they are separated, and the heating unit 30 is moved to the heating position.

Then, the first and second holding units 10, 20 are moved to the second position, and the contact faces 11, 21 are brought into contact with the heating unit 30 (the first and second heating faces 31, 32).

In this state, the second body 1b is moved in the lateral direction toward the third body 1c, and the second and fourth fusion welding devices 2b, 2d (the first moving body 80) are respectively moved in the vertical direction toward the first and third fusion welding devices 2a, 2c.

In this manner, a distance between the first fusion welding device 2a and the third fusion welding device 2c, and a distance between the second fusion welding device 2b and the fourth fusion welding device 2d in the lateral direction are reduced. At the same time, a distance between the first fusion welding device 2a and the second fusion welding device 2b, and a distance between the third fusion welding device 2c and the fourth fusion welding device 2d in the vertical direction are reduced.

In other words, the frame 3 in a rectangular shape is reduced in size keeping similarity, and the end faces 8a of the adjacent resin frame members 8 are pressed to the heating unit 30 thereby to be fused.

Because this pressing force acts as a counteraction on the end faces 8a at the opposite side, the end faces 8a at the opposite side are also pressed to the heating unit 30 to be fused.

Thereafter, the first and second holding units 10, 20 are moved to the third position where they are separated, and the heating unit 30 is moved to the retreating position.

Then, the first and second holding units 10, 20 are moved to the first position to bring the contact faces 11, 21 into contact.

In this state, the second body 1b, and the second and fourth fusion welding devices 2b, 2d are moved in the same manner as described above, whereby the end faces 8a of the resin frame members 8 are pressed to each other thereby to be joined by fusion welding.

In the above described first and second embodiments, the second body 1b moves so as to approach and separate from the third body 1c. Alternatively, it is possible to move the third body 1c or to move both the second and third bodies.

According to an aspect of the present invention, the end portions of the works 8 which have been fused with the heating unit 30 are held by the first and second holding units 10, 20, and the first and second holding units 10, 20 are synchronously moved by the synchronous moving unit 60 in a state where the contact faces 11, 21 are in contact with each other, whereby the end faces 8a of the works 8 are pressed in the longitudinal directions thereof inside the first and second holding units 10, 20 to be joined.

Therefore, occurrence of fins can be reliably prevented, when the end portions of the works 8 are joined by fusion welding.

Moreover, there is no necessity of moving the works 8 in the longitudinal directions, because the works 8 are joined by moving the first and second holding units 10, 20. Therefore, when the end portions of a plurality of the works 8 are joined by fusion welding to form the frame, it is possible to join the end portions of the works by fusion welding at the same time in the respective corner parts of the frame.

According to an aspect of the present invention, the first and second holding units 10, 20 are moved by the synchronous moving unit 60 in a state where the contact faces 11, 21 of the first and second holding units are in contact with the first and second heating faces 31, 32 of the heating unit 30, whereby the end faces 8a of the works 8 are pressed to the first and second heating faces 31, 32 of the heating unit, and the end portions of the works 8 are fused inside the first and second holding units 10, 20.

Therefore, when the end portions of the works 8 are fused, fins will not occur.

According to an aspect of the present invention, the moving body 80 is moved with respect to the base member 81, whereby the first and second holding units 10, 20 are synchronously moved, and the heating unit 30 is also moved at the same time.

Therefore, the synchronous moving unit 60 is simple in structure, and can be easily operated and controlled.

According to an aspect of the present invention, the resin frame can be assembled by joining the end portions of the resin frame member by fusion welding, and fins will not occur at a time of joining by fusion welding.

Moreover, because the end portions of the resin frame members 8 can be joined by fusion welding at the same time in the respective corner parts of the resin frame, it is possible to assemble the resin frame efficiently in a short time.

What is claimed is:

1. A fusion welding device, comprising:

a first holder, having a first face, and adapted to hold at least an outer peripheral face of an end portion of a first work in a state where the first work is movable in a longitudinal direction thereof;

a second holder, having a second face opposed to the first face, and adapted to hold at least an outer peripheral face of an end portion of a second work in a state where the second work is movable in a longitudinal direction thereof;

a heater, operable to heat the first work and the second work;

a first mover and a second mover, adapted to move the first holder and the second holder in such directions that the first face and the second face come close to or apart from each other;

a third mover, adapted to move the first holder and the second holder in synchronization with each other in a direction along the first face and the second face; and fourth mover, wherein:

the first holder and the second holder are moved by the third mover in a state where the first face and the second face are in contact with each other, whereby end faces of the end portions of the first and second works are pressed to each other in the longitudinal directions thereof in the first and second holders, the heater has a third face and a fourth face, when the heater is disposed in a first position, the third face can be contacted with the first face of the first holder and the fourth face can be contacted with the second face of the second holder, when the heater is disposed in a second position, the third face cannot be contacted with the first face and the fourth face cannot be contacted with the second face, the fourth mover moves the heater between the first position and the second position, and when the first and second holders are moved by the third mover, the heater is moved together with the first and second holders, the first holder, the second holder, the heater, the first mover, the second mover, and the fourth mover are provided on a moving body, and the third mover includes a base member and the moving body mounted on the base member so as to move in the direction along the first face and the second face, the first holder has a first holding space in which the first work is movable, the second holder has a second holding space in which the second work is movable, and when the first holder and the second holder are moved by the third mover, the first holder and the second holder hold the first work and the second work such that the first and second faces of the first and second holders and the end faces of the end portions of the first and second works are continued to be flush with each other respectively.

2. An assembling apparatus, incorporating a plurality of the fusion welding device according to claim 1 and respectively mounted to corner parts of a resin frame to be assembled.

3. An assembling apparatus, comprising:

a body, including a first body, a second body attached to the first body so as to move in a lateral direction, and a third body attached to the first body, the second body provided with a first fusion welding device and a second fusion welding device which can move in a vertical direction, the third body provided with a third fusion welding device and a fourth fusion welding device which can move in a vertical direction wherein:

each of the first, second, third and fourth fusion welding devices is provided with a first and second holders adapted to hold at least outer peripheral faces of end portions of resin frame members in a state where the frame members are movable in longitudinal directions thereof, a heater operable to heat the frame members, a first and second mover operable to move the first and second holders in such directions that first contact faces of the first and second holders, which are opposed to each other, come close to or apart from each other, a third mover, operable to move the first and second holders in synchronization with each other in a direction along the first contact faces, respectively, and a fourth mover, the first, second, third and fourth fusion welding devices are positioned in respective corner parts of a frame, and both of the end portions of each of the frame members are respectively held by the first and second holders of adjacent two of the first, second, third and fourth fusion welding devices, and the first, second, third and fourth fusion welding devices are moved, in a state where the first contact faces are in contact with each other, in such directions that distances of adjacent two of the first, second, third and fourth fusion welding devices are reduced, so that the end portions of the frame members are joined by fusion welding:

the heater has second contact faces, when the heater is disposed in a first position, the second contact faces of the heater can be contacted with the first contact faces of the first and second holders, when the heater is disposed in a second position, the second contact faces cannot be contacted with the first contact faces of the first and second holders, the fourth mover moves the heater between the first position and the second position, and when the first and second holders are moved by the third mover, the heater is moved together with the first and second holders, the first holder the second holder, the heater, the first mover, the second mover, and the fourth mover are provided on a moving body, and the third mover includes a base member and the moving body mounted on the base member so as to move in the direction along the first contact faces, the first and second holders have first and second holding spaces in which the frame members are movable, and when the first holder and the second holder are moved by the third mover, the first holder and the second holder hold the frame members such that the first contact faces of the first and second holders and end faces of the end portions of the frame members are continued to be flush with each other, respectively.

4. The fusion welding device according to claim 3, wherein:

each of the first and second holders has an upper mold formed with a recess and a lower mold formed with a recess, and each of the first and second holding spaces are formed by combining the recess of the upper mold and the recess of the lower mold.

* * * * *